United States Patent [19]

Doyle

[11] Patent Number: 6,058,239
[45] Date of Patent: May 2, 2000

[54] VIDEO CATALOG WITH VOCAL TAGS

[76] Inventor: John F Doyle, 20 Snowberry Ct., Hunt Valley, Md. 21030

[21] Appl. No.: 08/833,846

[22] Filed: Apr. 10, 1997

[51] Int. Cl.[7] .............................. H04N 5/76; H04N 5/928
[52] U.S. Cl. ................................ 386/46; 386/96
[58] Field of Search .................. 386/46, 83, 92, 386/52, 55, 125, 98, 96, 95, 106, 105, 97, 69, 81, 82; 360/32; H04N 5/76, 5/928

[56] References Cited

U.S. PATENT DOCUMENTS 5,136,655   8/1992   Bronson .
5,600,756   2/1997   Ely .
5,617,407   4/1997   Bareis .................................. 369/275.3

Primary Examiner—Robert Chevalier

[57] ABSTRACT

A system and method employing computer speech recognition of users' vocal tag utterances to create a catalog (1) of the contents of user-recorded audio-video media such as VCR tapes. Numeric labels are affixed to each tape for identification. A vocal tag (24) is spoken into a microphone (5), associated with each recorded program and stored in a database of tape contents within a VCR (13). The matching of a new, reference utterance (7) with those stored in the database provides a means to review the contents of all tapes containing the selected program.

15 Claims, 9 Drawing Sheets

| Volume ID | Textual Description | Sound ID |
|---|---|---|
| 1 | 00:00 – 01:00 Tue Mar 17 09:00-10:00 Chan 23 | Key1 |
| 1 | 01:00 – 01:30 Tue Mar 17 13:00-13:30 Chan 12 | Key2 |
| 2 | 00:00 – 01:00 Wed Mar 18 09:00-10:00 Chan 23 | Key1 |
| 2 | 01:00 – 01:30 Wed Mar 18 13:00-13:30 Chan 12 | Key2 |
| 2 | 01:30 – 02:30 Thu Mar 19 09:00-10:00 Chan 23 | Key1 |
| 3 | 00:00 – 01:00 Sat Mar 21 10:00-11:00 Chan 21 | Key3 |

FIG. 5

TAPE #2

CANCEL
Wed Mar 18 09:00-10:00 Chan 23
Wed Mar 18 13:00-13:30 Chan 12
Thu Mar 19 09:00-10:00 Chan 23

PREV TAPE      NEXT TAPE

FIG. 8

VIDEO CATALOG WITH VOCAL TAGS

BACKGROUND

1. Field of Invention

This invention relates to audio-video data storage and retrieval and in particular to techniques for the selective retrieval of data stored on audio-video media, such as video tape and video disks.

2. Description of Prior Art

Audio-video recording devices such as Video Cassette Recorders (VCR's) have been automated with regard to scheduling recording sessions. The user may specify date, time, duration and TV channel either explicitly or implicitly through published codes such as VCR-Plus. Advances in the automation of recording do not address the great inconvenience of identifying and positioning specific media for playback. Bronson U.S. Pat. No. 5,136,655 (1992) and Ely U.S. Pat. No. 5,600,756 (1997) address this problem by processing the video and/or audio data through a speech recognition engine to create text-based indices for subsequent matching. Bareis U.S. Pat. No. 5,617,407 (1997) includes templates for speech recognition on the storage medium. Neither of these techniques can be practically applied to allow a consumer to catalog the television programs recorded at home. The consumer's state of the art is to manually write the contents of a recording session on a paper label.

Another difficulty lies in identifying which media is available to safely reuse for future recording sessions. Without a strictly observed manual protocol, the user cannot easily determine which tapes contain programs that have been viewed. If no unviewed tapes are available, the user cannot easily determine which tapes have been recorded less recently than others and are therefore candidates to be reused.

A database of media contents could be maintained in the recording device or a personal computer. This would facilitate the organization of the user's recording collection, and could automate the positioning of a VCR tape for playback. The drawback to such a scheme is the alphabetic nature of the program identification. The user does not have a convenient device for entering alphanumeric data, although provision of a physical keyboard or a video emulation of a keyboard is possible. More detrimental to such a scheme is the time required entering such data. Typing in program names, with correct spelling, would be onerous to most consumers.

Speech recognition by computers has been applied to command and dictation applications. In both applications, the speech recognition engine compares an utterance by the user to a number of possible reference utterances and returns one or more potential matches, together with a confidence score for each. Command applications process discrete utterances that may be a word or phrase that is clearly delimited by silence. Dictation demands the more difficult task of parsing input utterances from a continuous stream. In a speaker-dependent model, the current user has previously provided the reference utterances. This is not the case in a speaker-independent model, where accurate matching is more difficult.

Advances in speech recognition algorithms and the increased ratio of performance to cost of microprocessor technology make feasible the introduction of speech recognition to consumer devices such as VCR's. While speech recognition could be applied to VCR's in a command context, its appeal to consumers would be limited because it would cost more but provide no real benefit over a touch-base remote control.

SUMMARY OF THE INVENTION

The present invention employs computer speech recognition of users' vocal tag utterances to catalog the contents of user-recorded audio-video media such as VCR tapes. Numeric labels are affixed to each tape for identification. A vocal tag is spoken into a microphone, associated with each recorded program and stored in a database of tape contents within the VCR. The matching of a new, reference utterance with those stored in the database provides a means to review the contents of all tapes containing the selected program. The recorder can then be commanded to automatically position the appropriate tape to the selected program and initiate playback. Additionally, video displays indicate which programs have been viewed, and which tapes are available for reuse.

OBJECTS AND ADVANTAGES

Accordingly, several objects and advantages of the invention are:

(a) to provide a catalog of recorded programs which can be reviewed on the TV screen;

(b) to provide an easily entered annotation to each program in the form of a vocal tag;

(c) to employ speech recognition technology to retrieve catalog entries for review in response to an easily entered vocal tag;

(d) to automatically position recording media for playback of selected programs;

(e) to facilitate selection of media for reuse by sorting the catalog by date and time.

Further objects and advantages will become apparent from a consideration of the ensuing description and drawings.

DRAWING FIGURES

FIG. 5 shows the organization of an electronic catalog of video media.

FIG. 8 shows a video display of catalog entries for one volume video media with the recalled program highlighted.

Figure 1:
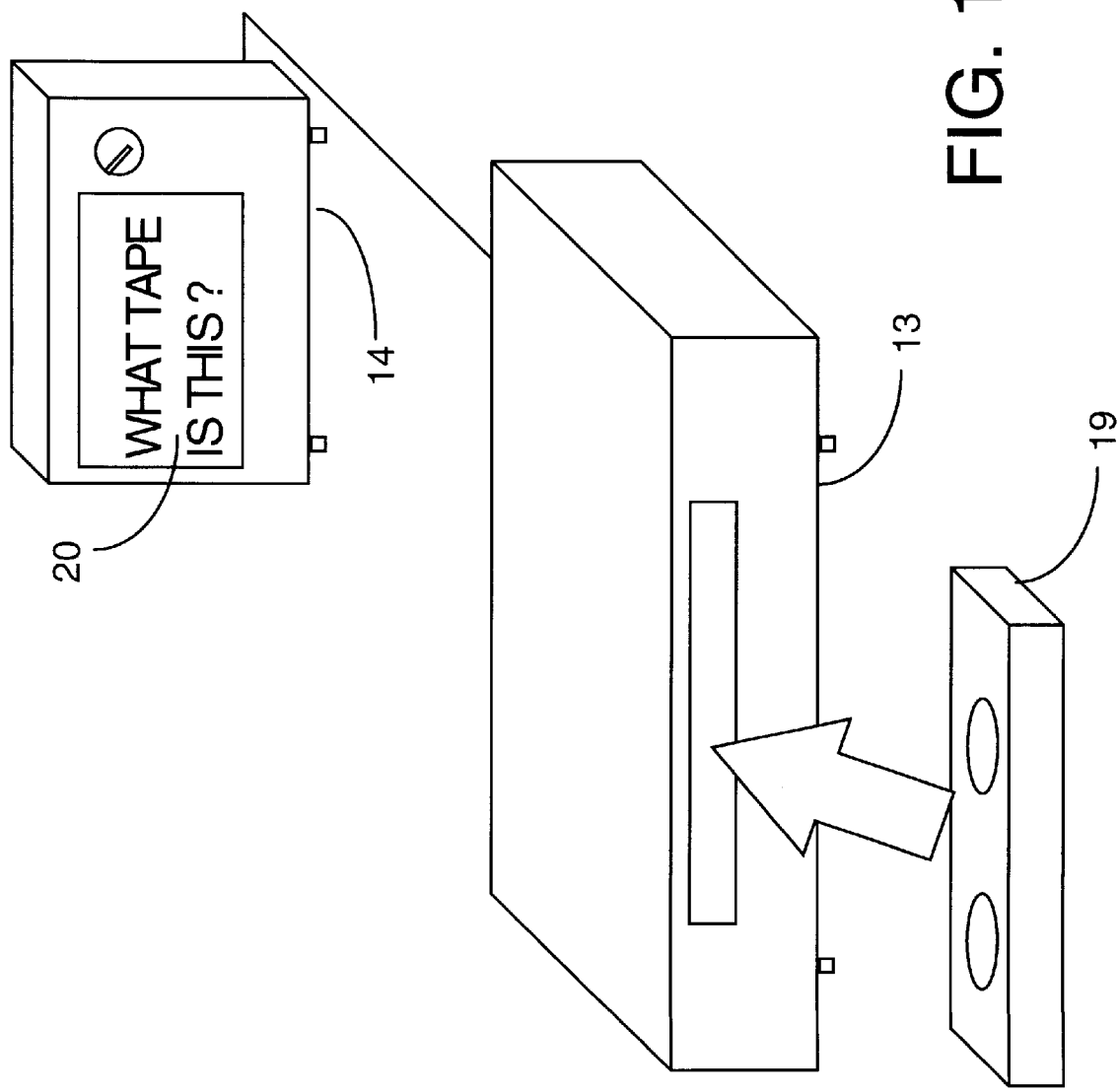
FIG. 1 shows a volume being loaded in a recorder or playback device.

REFERENCE NUMERALS IN DRAWINGS 1 electronic catalog
2 identifier of a volume of video media
3 textual description 4 tag identifier of key sound
5 microphone
6 key sound
7 digital representation of reference sound
8 speech engine algorithm to find best matching sound
9 tag identifier of the best matching or new key sound
10 video display of a set of entries
11 remote control unit
12 manual command button
13 recording/playback device
14 television
15 video display of contents of a selected volume
16 video display of instruction to load a selected volume into the playback device
17 video display of notification that playback device is positioning volume
18 video display of playback of selected program
19 volume of video programs
20 video display of request for identification of volume
21 record command button
22 video display of instruction to vocalize a key sound
23 catalog search algorithm to build list of tapes
24 trial key sound
25 algorithm to save the trial key file as a new key file
26 new key file
27 algorithm to make a new electronic catalog entry
28 tag ID of best matching key sound file

DETAILED DESCRIPTION OF THE PREFERRED EMBODIMENT(S)

Figure 9:
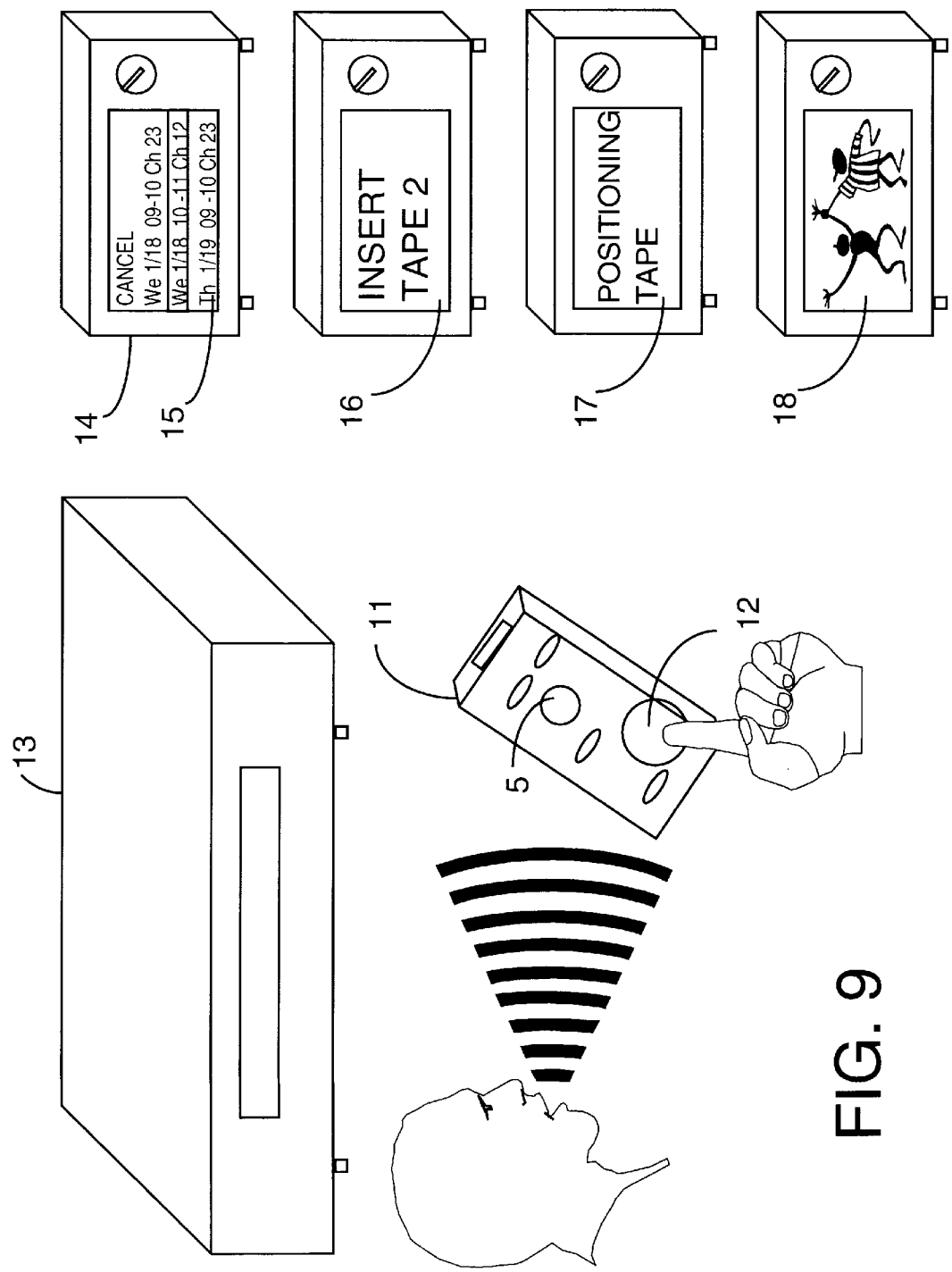
FIG. 9 shows the major steps involved in accessing the catalog by voice for the purpose of automatically playing a selected program on a playback device.

The apparatus and method are illustrated by an example system shown in FIG. 9 comprising a microcomputer-controlled VCR 13, a remote control unit 11, a microphone 5, and a television 14. Remote control unit 11 communicates with a control computer (not shown) embedded in the VCR. The control computer, hereafter called the computer, performs all of the logic functions of the invention.

Figure 2:
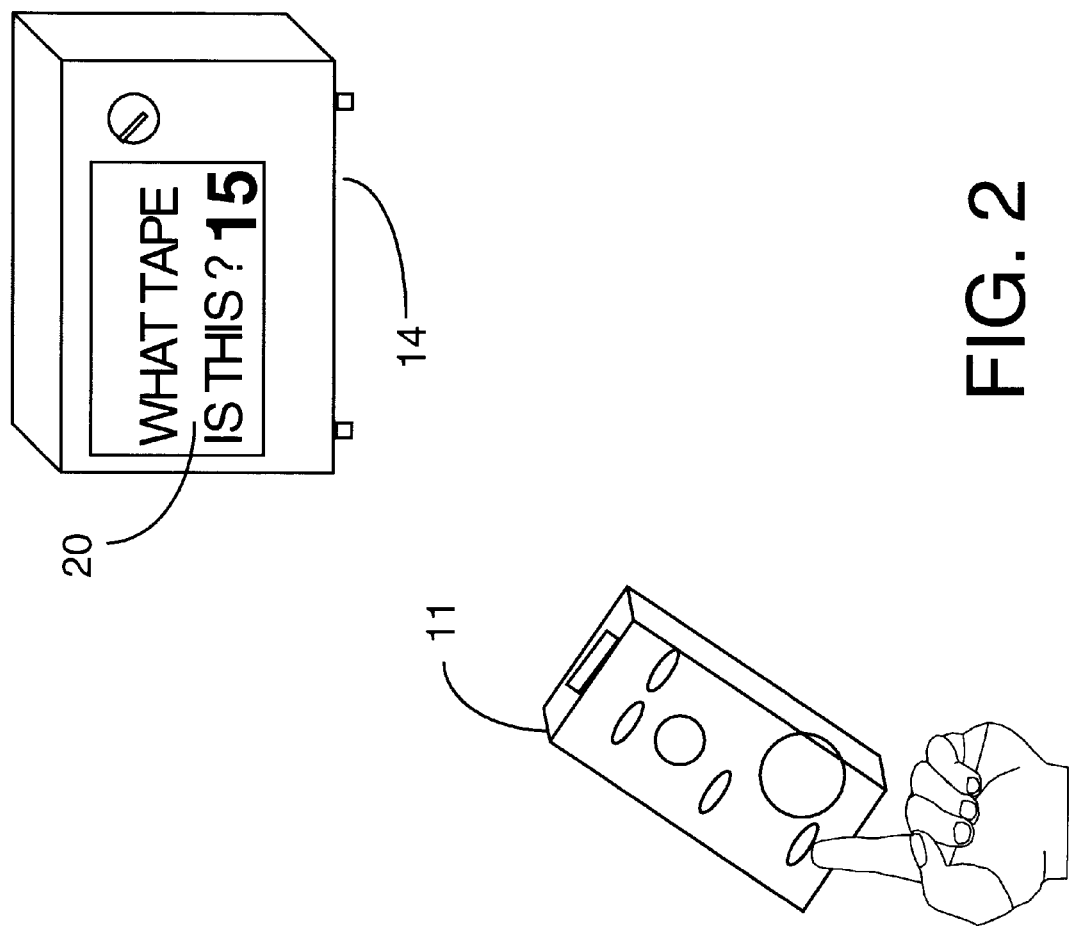
FIG. 2 shows the current volume number being entered and displayed.

FIG. 1 illustrates the insertion of a tape 19 into VCR 13. In response to any tape insertion, the VCR displays on TV 14 a prompt 20 for the user to enter the volume label of the tape. FIG. 2 illustrates the user entering a numeric volume label using the numeric pad on remote control 11. The computer then stores the volume label in non-volatile memory. The VCR also maintains in non-volatile memory the last position for each tape. When a tape is loaded, the VCR's current position counter is initialized to this saved value.

Figure 3:
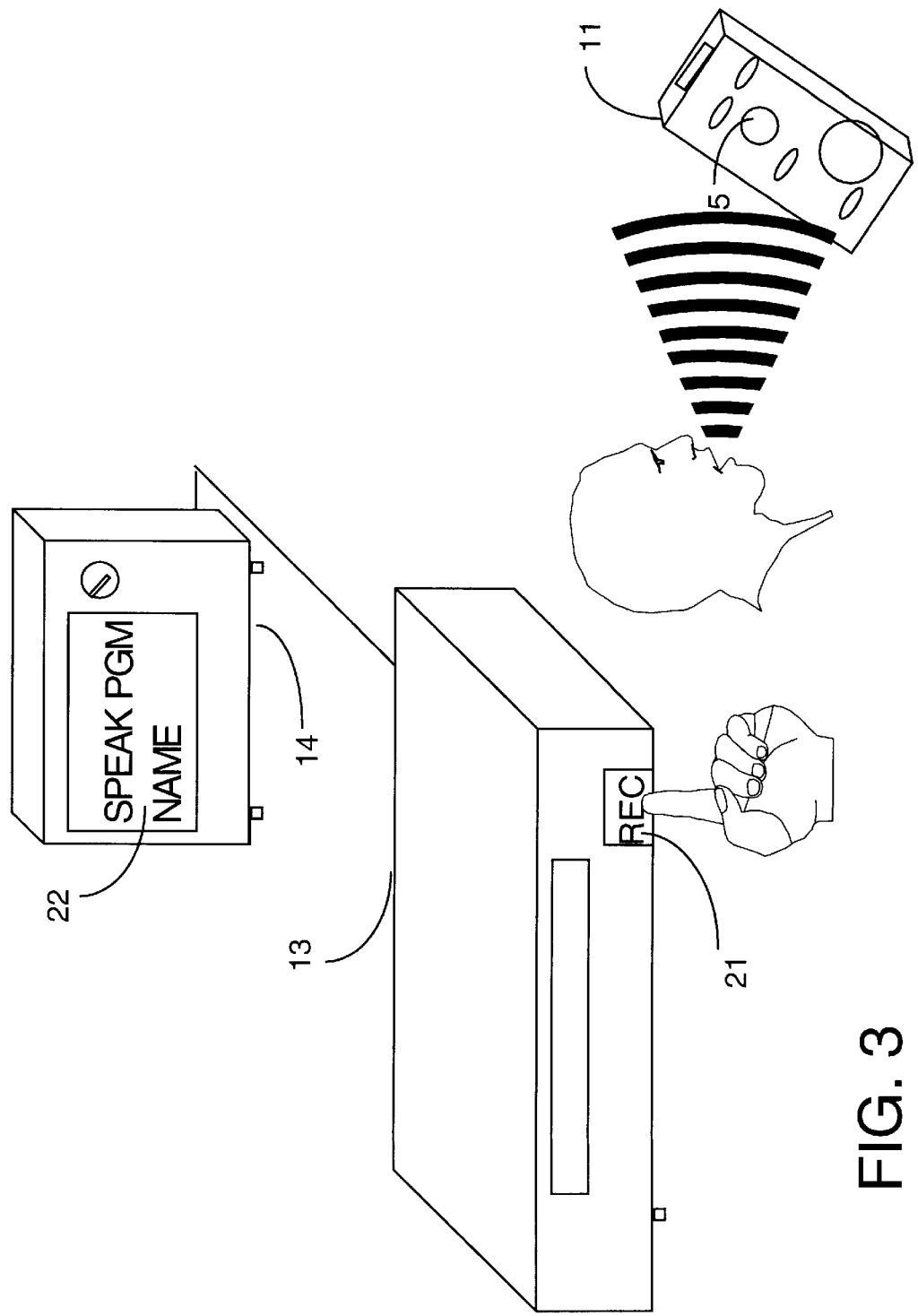
FIG. 3 shows the initiation of a recording session and the entry of a vocal tag utterance.

FIG. 3 illustrates the initiation of a recording session by the user depressing a record command button 21. In response, the VCR displays a prompt 22 for the user to speak a trial vocal tag into the microphone 5.

Figure 4:
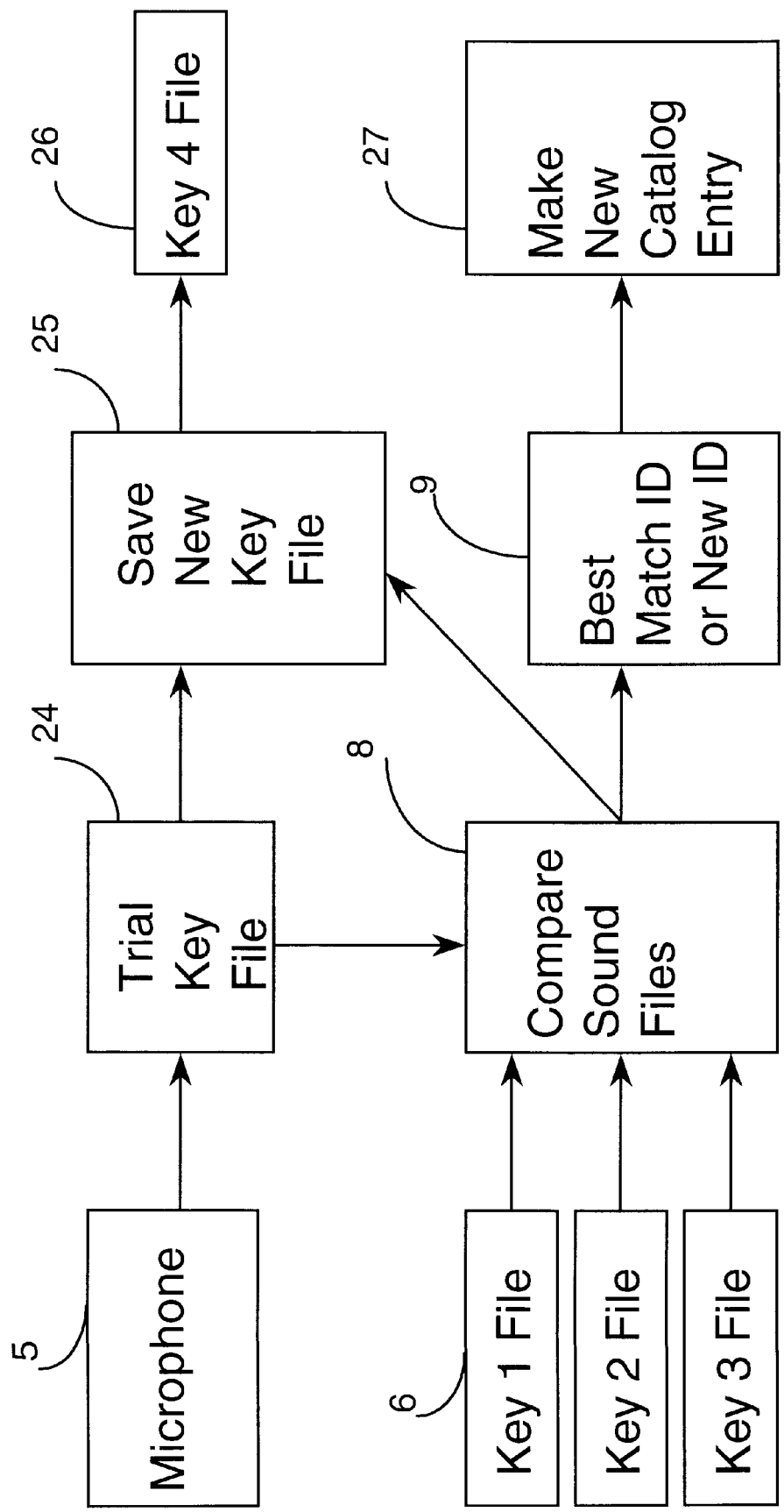
FIG. 4 shows a block diagram of the processing of a vocal tag utterance.

FIG. 4 shows a block diagram of the processing of the trial vocal tag. Processing utilizes a modular suite of software algorithms known as a speech recognition engine 8. The computer processes the trial vocal tag into a resulting trial key file 24. The nature of this processing is dependent on the speech recognition engine employed. The trial key file is compared with a set of all previously stored key files 6 by speech recognition engine 8 to determine if there is a close match. If there is a close match, there is no need to create a new key file, and a tag ID 9 is set to the ID of the matching key file. If there is a tentative match, the user is prompted to repeat the vocal tag, and the above comparison is repeated. If there is no match, an algorithm 25 saves the trial key file as a new permanent key file 26, and tag ID 9 is set to the ID of the newly created key file. In any case, an algorithm 27 creates a new catalog entry for the recording session.

The above process diagramed in FIG. 4 is also applied when a future recording session is scheduled.

FIG. 5 illustrates a catalog 1 containing six entries. Each catalog entry contains the volume label 2, a textual description 3 of the recording session, and a key tag ID 4 of the corresponding vocal tag. In the example in FIG. 5, multiple recording sessions share the same key tag, and multiple recording sessions share the same tape. Textual description 3 contains information about the position of each session on the tape, the date, time, duration, and channel.

Figure 6:
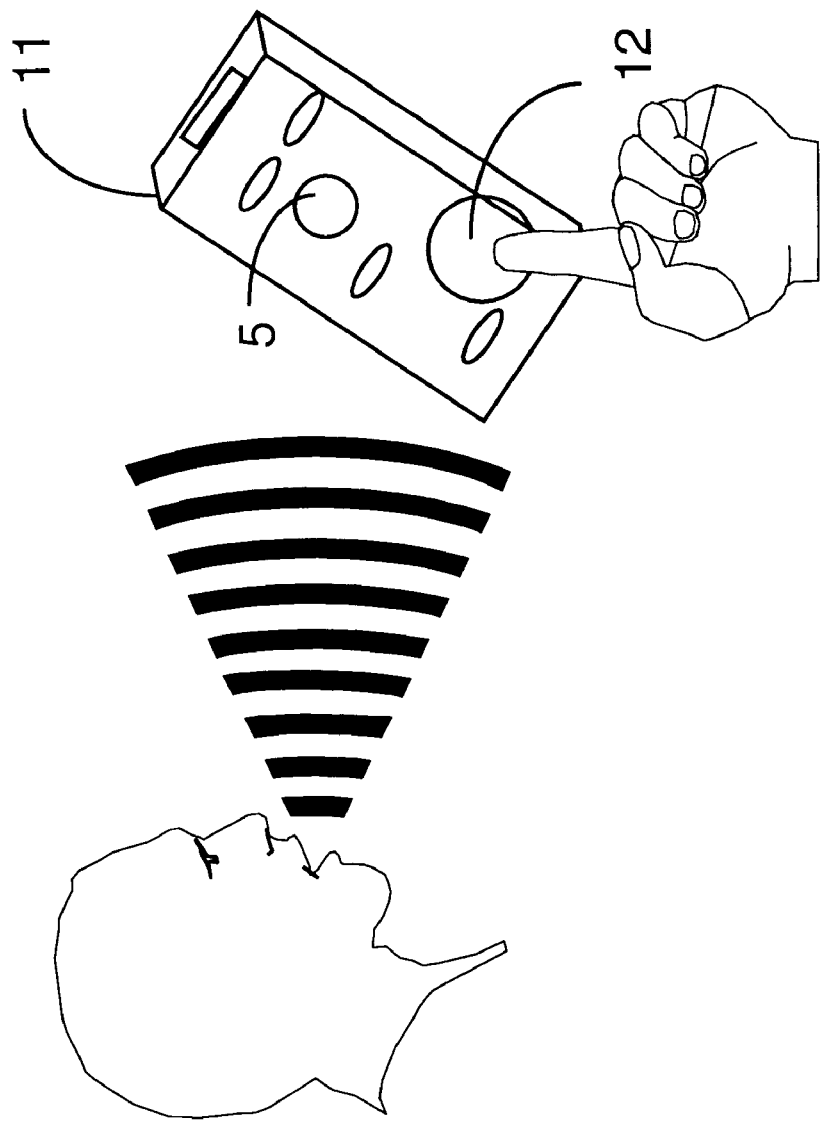
FIG. 6 shows the capture of a reference utterance to recall a program.

FIG. 6 illustrates a user invoking a catalog search by depressing a command button 12 and vocalizing a reference tag utterance into microphone 5. The command button is used to initiate the search so that the computer can activate the microphone and optionally prompt the user via TV 14.

Figure 7:
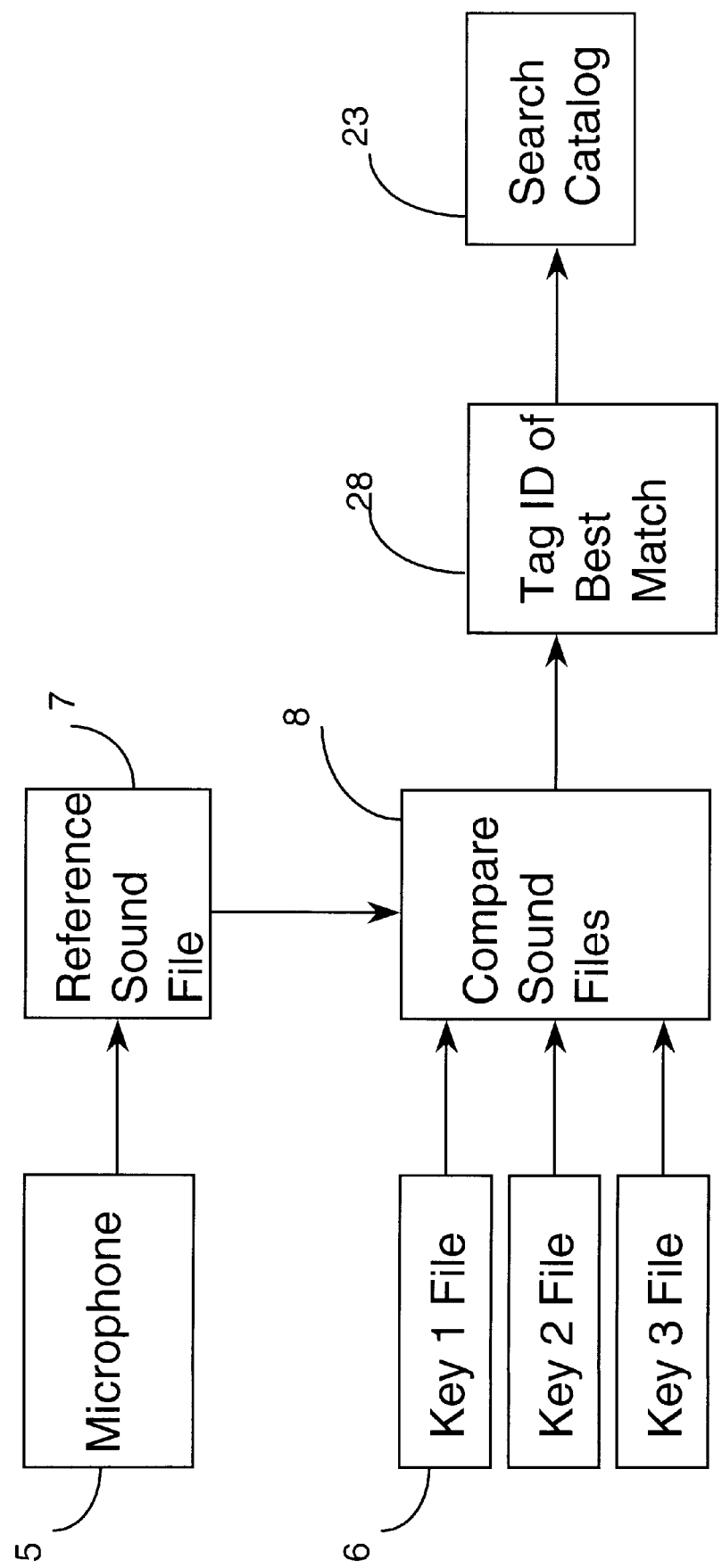
FIG. 7 shows a block diagram of the comparison of a reference utterance to stored tag utterances.

FIG. 7 shows a block diagram of the processing of a reference vocal tag. The computer processes the vocal tag from microphone 5 into a resulting reference sound file 7. Speech recognition engine 8 compares this reference sound file with the set of all of the stored key files 6 to determine if there is a close match. If there is a close match, the tag ID of the matching key file is saved in an identifier named best match 28. Search algorithm 23 searches catalog 1, listing all tapes containing one or more recording sessions where key tag ID 4 equals best match 28. This list of tapes is sorted by the record time of the most recent session on each tape. The sorted list of tapes is the primary product of the invention.

FIG. 8 illustrates a video display 10 that can be generated from the sorted list of tapes. The black rectangle surrounding the second session entry in FIG. 8 is a highlight cursor. This is initially positioned to the session on this tape that the user had requested via the reference vocal tag. The user may move the highlight cursor up or down to select other sessions or the CANCEL command. This movement is accomplished using up/down keys on the remote control. Left and right arrow keys are used to select the previous or next tape in the list, respectively. The user may depress a command button to select a session for viewing.

Video display 10 in FIG. 8 can also be used to review all cataloged tapes to determine which programs have been viewed or to review the oldest tapes to select one for reuse. These different uses are accomplished by menu or command options varying the selection criteria used in building the list of tapes.

FIG. 9 illustrates the combined steps of: the user vocalizing a reference tag into microphone 5; the user selecting a program for viewing from a video display 15 by depressing command button 12; the computer displaying a request that the appropriate tape be loaded 16; the computer displaying a notification that the VCR is positioning the tape to the selected program 17; and a display of the playback of the selected program 18.

SUMMARY, RAMIFICATIONS, AND SCOPE

Accordingly, the reader will see that the present invention employs the techniques of computer speech recognition to catalog the contents of user-recorded video or audio-video media such as VCR tapes. A vocal tag is spoken into a microphone, associated with each recorded program and stored in a database of tape contents within the VCR. The matching of a new utterance with those stored in the database provides a means to review the contents of all tapes containing the selected program. The recorder can then be commanded to automatically position the appropriate tape to the selected program for playback. Furthermore, the invention has advantages in that:

(a) it provides a catalog of recorded programs which can be conveniently reviewed on the TV screen;

(b) it provides an easily entered annotation to each program in the form of a vocal tag;

(c) it employs speech recognition technology to retrieve catalog entries for review in response to an easily entered vocal tag;

(d) it can automatically position recording media for playback of selected programs;

(e) it facilitates selection of media for reuse by displaying the catalog contents sorted by date and time.

Although the description above contains many specificities, these should not be construed as limiting the scope of the invention but as merely providing illustrations of a presently preferred embodiment of this invention. The media could be laser or video disk rather than tape. The remote control button commands could be replaced by voice commands. The microphone could reside in the main housing of the record/playback device. The microphone and/or the speech recognition engine could reside in a housing separate from the record/playback device. The means of comparing a reference sound to key sounds could be an algorithm and/or device unrelated to speech recognition.

Thus the scope of the invention should be determined by the appended claims and their legal equivalents, rather than by the examples given.

I claim:

1. A system for cataloging video media comprising:
a computer controlled record/playback device for playing said video media, said computer controlled record/playback device including an indexed memory for storing descriptive information comprising a volume label identifying each volume of said video media, and location data regarding each recording session on each of said volumes of media;
a microphone connected to said record/playback device;
means for labeling each volume of media with said volume label for unique identification;
means for identifying which volume is loaded in the record playback device;
means for capturing a tag utterance associated with a recording session on a volume of media;
means for storing the tag utterance or a processed representation of the tag utterance suitable for later matching;
means for capturing a reference utterance into a microphone when one or more recording sessions are to be recalled;
means for matching the reference utterance to said captured tag utterances to select at least one of said recording sessions corresponding to the reference utterance.

2. The system of claim 1, wherein said computer controlled record/playback device further comprises means for displaying on a television or other video display device information including portions of the descriptive information, location data, and volume label of the selected set of recording sessions.

3. The system of claim 2, wherein said computer controlled record/playback device further comprises means for monitoring the playback of recording sessions and storing the information that a recording session has been viewed; and means for indicating which programs have been viewed via said displayed information.

4. The system of claim 2 wherein the displayed information is sorted by recorded date.

5. The system of claim 1 further including:
means for prompting for insertion of the media volume containing a selected recording session based on the stored volume label.

6. The system of claim 1 further including:
a jukebox containing multiple volumes of media;
means for loading from the jukebox the media volume containing a selected recording session based on the stored volume label.

7. The system of claim 1 further including:
means for positioning the media volume for playback of a selected recording session based on the stored location data.

8. A method of cataloging video media including the steps of:
labeling each volume of said video media for unique identification;
identifying a volume of media when loaded into a record/playback device;
capturing a tag utterance into a microphone for association with a recording session on the identified volume of media;
storing said volume label, location data for said recording session, and a processed representation of the tag utterance in said record/playback device for later matching;
capturing a reference utterance into a microphone when a recording session is to be recalled;
matching the reference utterance to each stored tag utterance to select a recording session for playback.

9. The method of claim 8 further including the step of:
initiating said record/playback device to display on a television or other video display device information including portions of the descriptive information, location data, and volume label of the selected recording session.

10. The method of claim 9 further including the steps of:
monitoring the playback of recording sessions and storing the information that a recording session has been viewed in said record/playback device; and
initiating said record/playback device to indicate which programs have been viewed by a notation or other indication in the displayed information.

11. The method of claim 9 wherein the displayed information is sorted by recorded date.

12. The method of claim 8 further including the step of:
prompting for insertion of the media volume containing a selected recording session based on the stored volume label.

13. The method of claim 8 further including the step of:
loading from a jukebox the media volume containing a selected recording session based on the stored volume label.

14. The method of claim 8 further including the step of:
positioning the media volume for playback of a selected recording session based on the stored location data.

15. A system for cataloging video media comprising:
a computer controlled video recorder/player including an indexed memory for storing voice tag utterances corresponding to tracks on and volumes of said video media;
a microphone connected to said video recorder/player;
a video display connected to said video recorder/player; and
a plurality of video volumes each including a volume label identifying said volume of video;

whereby said system allows indexing of said plurality of video volumes by identifying each volume of media when loaded in said video recorder/player, capturing a tag utterances into said microphone for association with corresponding tracks on the identified volume of media, and converting said tag utterances into digital representations suitable for storage and later matching; and said system allows retrieval of a selected track on a selected video volume by capturing a reference utterance into a microphone when said track is to be recalled, converting said reference utterance into a digital representation suitable for matching, matching the reference utterance to a corresponding stored tag utterance, prompting said user via said video display to load a selected volume of said video media into said video recorder/player, and retrieving the selected track on the selected video volume for playback.

* * * * *